US008653795B2

(12) United States Patent
Wang et al.

(10) Patent No.: US 8,653,795 B2
(45) Date of Patent: Feb. 18, 2014

(54) CHARGER CIRCUIT

(75) Inventors: Hsuan-Kai Wang, New Taipei (TW);
Nien-Hui Kung, Toufen Township, Miaoli County (TW); Wei-I Li, Tainan (TW)

(73) Assignee: Richtek Technology Corporation, R.O.C., Chupei, Hsin-Chu (TW)

( * ) Notice: Subject to any disclaimer, the term of this patent is extended or adjusted under 35 U.S.C. 154(b) by 336 days.

(21) Appl. No.: 13/134,036

(22) Filed: May 26, 2011

(65) Prior Publication Data
US 2012/0112705 A1 May 10, 2012

(30) Foreign Application Priority Data

Nov. 10, 2010 (TW) .................................. 99221755 U

(51) Int. Cl.
*H02J 7/04* (2006.01)
*H02J 7/00* (2006.01)

(52) U.S. Cl.
USPC ............................. 320/152; 320/125; 320/160

(58) Field of Classification Search
USPC ............................................... 320/125, 152, 160
See application file for complete search history.

(56) References Cited

U.S. PATENT DOCUMENTS

| 5,592,069 | A | * | 1/1997 | Dias et al. ..................... 320/106 |
| 5,773,956 | A | * | 6/1998 | Wieczorek ..................... 320/152 |
| 6,326,771 | B1 | * | 12/2001 | Popescu-Stanesti ........... 320/139 |
| 6,373,224 | B1 | * | 4/2002 | Goto et al. ..................... 320/119 |
| 6,489,751 | B2 | * | 12/2002 | Small et al. .................... 320/150 |
| 6,771,050 | B2 | * | 8/2004 | Yamashita ..................... 320/150 |
| 7,615,969 | B2 | * | 11/2009 | Meng et al. .................... 320/150 |
| 7,688,037 | B2 | * | 3/2010 | Huh .............................. 320/138 |
| 2002/0175659 | A1 | * | 11/2002 | Sakakibara .................... 320/150 |
| 2009/0058370 | A1 | * | 3/2009 | Odaohhara ..................... 320/152 |

\* cited by examiner

*Primary Examiner* — M'Baye Diao
(74) *Attorney, Agent, or Firm* — Tung & Associates

(57) ABSTRACT

The present invention discloses a charger circuit. The charger circuit comprises a control circuit and at least two charging paths. The control circuit determines to activate or inactivate each charging path according to a battery feedback signal representing the charging status. Accordingly, the battery is charged by input power in an optimal way so that the charging efficiency is improved and the overheating problem is solved.

3 Claims, 2 Drawing Sheets

CHARGER CIRCUIT

CROSS REFERENCE

The present invention claims priority to TW 099221755, filed on Nov. 10, 2010.

BACKGROUND OF THE INVENTION

1. Field of Invention

The present invention relates to a charger circuit, in particular to such charger circuit which includes at least two charging paths.

2. Description of Related Art

FIG. 1 shows a schematic diagram of a prior art charger circuit. As shown in FIG. 1, input power supplies a battery with a charging current, charging the battery through the charging path 11 of a charger circuit 10. A control circuit 12 obtains a battery feedback signal related to a battery charging status from the battery, and controls the charging path 11 accordingly such that when the battery charging status reaches a predetermined threshold, the charging path 11 is inactivated to finish the charging operation.

This conventional charger circuit charges the battery only by one charging path 11. In many applications, the charging path 11, the control circuit 12, and other circuits are integrated into an integrated circuit. Such conventional charger circuit is limited by the over temperature protection mechanism of the circuit; that is, the battery cannot be charged with a large current. Therefore, the charging time is long, and the charging efficiency is poor. Furthermore, due to heat dissipation issue of the charging path 11, the efficiency of the charging circuit 10 is further degraded.

In view of above, the present invention overcomes the foregoing defects by putting forth a charger circuit including at least two charging paths. The charger circuit can optimally select and adjust the charging paths according to the charging status and the environment temperature so as to improve the efficiency of the charger circuit and the issue of the over temperature protection, while it does not need a complicated the current design.

SUMMARY OF THE INVENTION

An objective of the present invention is to provide a charger circuit.

To achieve the foregoing objective, the present invention provides a charger circuit, comprising: a first charging path receiving input power, the first charging path being controlled by a first control signal to charge a battery with a first charging current; at least one second charging path receiving the input power, the second charging path being controlled by a second control signal to charge the battery with a second charging current; and a control circuit coupled to the first charging path and the second charging path, the control circuit receiving a battery feedback signal and outputting the first control signal and the second control signal according to the battery feedback signal.

In the foregoing charger circuit, the first path and the control circuit are preferably integrated into an integrated circuit, and the second charging path is outside the integrated circuit.

In one embodiment, the battery feedback signal is related to a charging status of the battery, and when the battery feedback signal reaches a predetermined value, the control circuit stops generating the second control signal so that the second charging path stops charging the battery.

In one embodiment, the foregoing charger circuit further comprises a temperature detection circuit coupled to the control circuit, the temperature detection circuit generating an over temperature detection signal as an input to the control circuit when an environment temperature detected by the temperature detection circuit is over a predetermined temperature threshold, wherein the control circuit determines whether or not to generate the first control signal and the second control signal according to the over temperature detection signal.

The objectives, technical details, features, and effects of the present invention will be better understood with regard to the detailed description of the embodiments below, with reference to the drawings.

DESCRIPTION OF THE PREFERRED EMBODIMENTS

Figure 1:
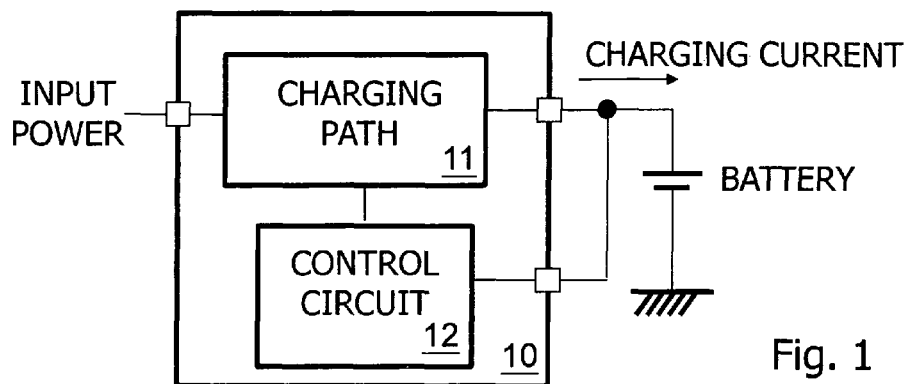
FIG. 1 shows a schematic diagram of a prior art charger circuit.
Figure 2:
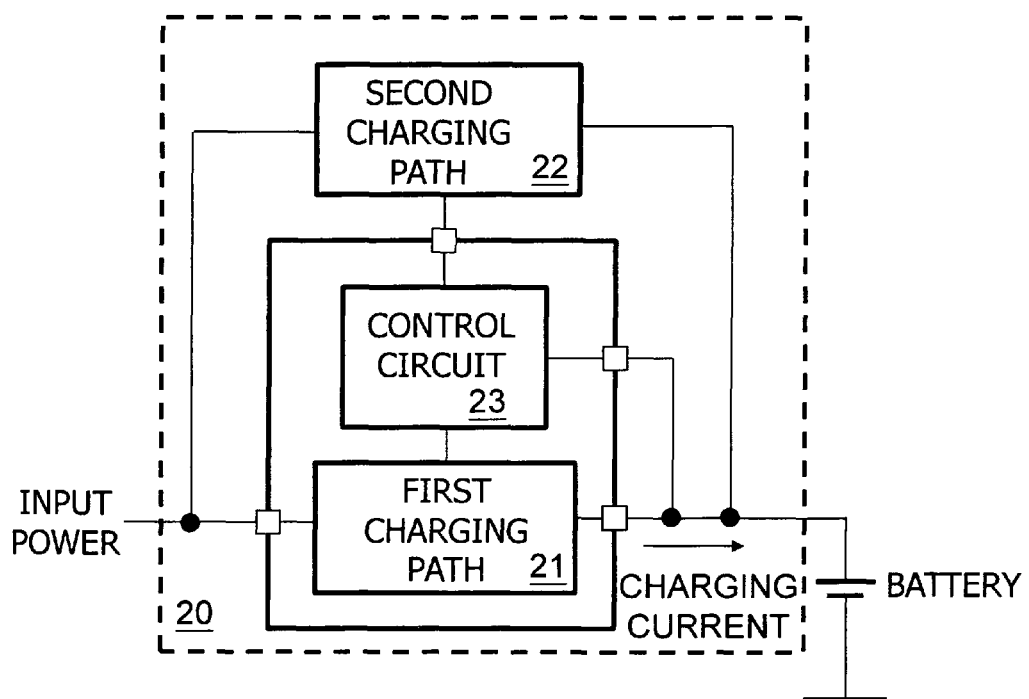
FIG. 2 shows an embodiment of the present invention.

Referring to FIG. 2, it shows an embodiment of the present invention. The object to be charged is not limited to the DC battery as shown for example, but may be various other electrical energy storage devices. As shown in this figure, input power supplies a battery with a charging current for charging the battery through the first charging path 21 and the second charging path 22 of a charger circuit 20. A control circuit 23 obtains a battery feedback signal (which may be, for example but not limited to, the voltage or the divided voltage of the battery) related to a battery charging status from the battery, and controls the first charging path 21 and the second charging path 22 accordingly. In one embodiment, the charging paths are controlled as thus. When the battery voltage is below a first predetermined threshold, the control circuit 23 generates a first control signal and a second control signal, activating both the first charging path 21 and the second charging path 22 to charge the battery with a large current. When the battery voltage is above the first predetermined threshold, the control circuit 23 stops generating the second control signal, inactivating the second charging path 22 so that only the first charging path 21 charges the battery. When the battery voltage is above a second predetermined threshold which is higher than the first predetermined threshold, the control circuit 23 stops generating the first control signal, inactivating the first charging path 21, and the charging operation is finished.

The above arrangement has the advantages that: first, the charging time is shortened because the battery is charged by a large current at an early stage; second, the battery charging status can be finely controlled because it is charged by a small current at a later stage. Furthermore, the second charging path 22 can be disposed outside the integrated circuit for better heat dissipation. When the battery is charged with a large current, because of the better heat dissipation conditions, the charging operation is less limited by the overheat protection in the circuit. Accordingly, the charging efficiency is further upgraded.

The control circuit 23 not only can activate or inactivate each charging path, but also can control the current amount of each path so that the charging operation can be more precisely controlled.

Figure 3:
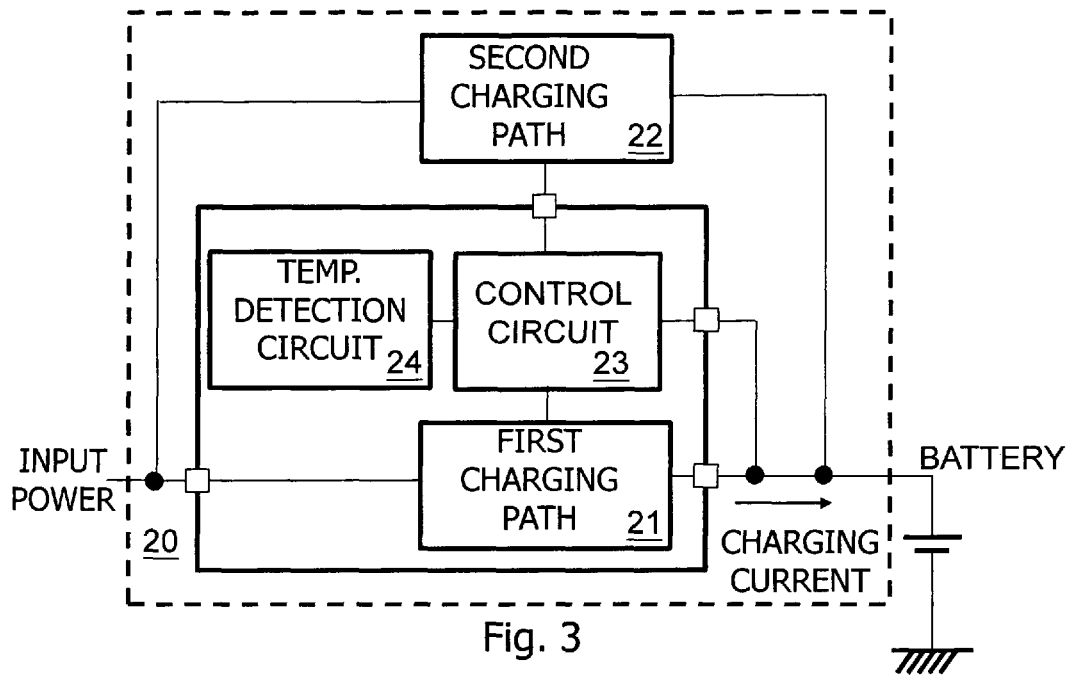
FIG. 3 shows another embodiment of the present invention.

Referring to FIG. 3, it shows another embodiment of the present invention. As shown in this figure, the charger circuit 20 further comprises a temperature detection circuit 24 coupled to the control circuit 23. When the temperature detection circuit 24 detects that the environment temperature is above a predetermined temperature threshold, it generates an over temperature detection signal as the input of the control circuit 23. The control circuit 23 determines whether or not to generate the foregoing first control signal and the foregoing second control signal according to the over temperature detection signal.

Figure 4:
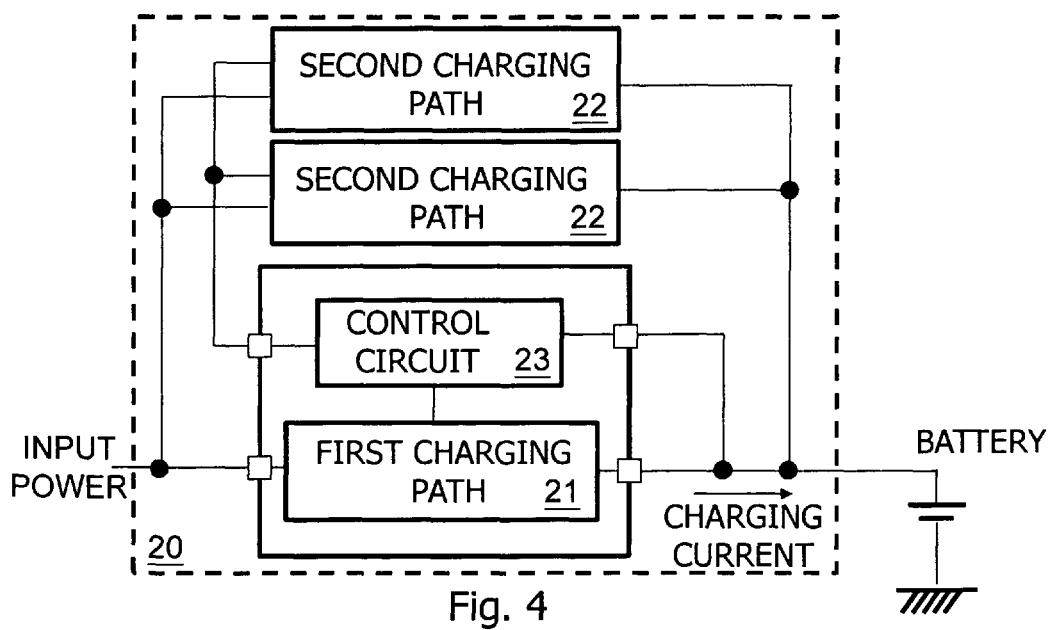
FIG. 4 shows another embodiment of the present invention.

Referring to FIG. 4, it shows another embodiment of the present invention. As shown in this figure, the charger circuit 20 comprises a plurality of second charging paths 22 to provide the control circuit 23 with more selectable and controllable paths. For example, when the battery voltage is low, the control circuit 23 can activate all of the charging paths so that the charging time is shortened. Or, according to the battery charging status, the environment temperature, the over temperature setting and so on, the control circuit 23 can inactivate some of the paths and adjusts the currents on the activated charging paths. The above can be achieved by, for example, controlling a controlled terminal of a power transistor (not shown) on the charging paths.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, in all of the embodiments, a device or circuit which does not affect the major functions of the signals, such as a switch, etc., can be added between two circuits illustrated to be directly connected with each other. For another example, the second charging path 22 can be disposed inside the integrated circuit. Thus, the present invention should cover all such and other modifications and variations, which should be interpreted to fall within the scope of the following claims and their equivalents.

What is claimed is:

1. A charger circuit, comprising:
   a first charging path receiving input power, the first charging path being controlled by a first control signal to charge a battery with a first charging current;
   at least one second charging path receiving the input power, the second charging path being controlled by a second control signal to charge the battery with a second charging current; and
   a control circuit coupled to the first charging path and the second charging path, the control circuit receiving a battery feedback signal and outputting the first control signal and the second control signal according to the battery feedback signal, wherein the battery feedback signal is related to a charging status of the battery, and:
   when the battery feedback signal is below a first predetermined threshold, the control circuit generates the first control signal and the second control signal, so that both the first charging path and the second charging path are activated to charge the battery with a large current;
   when the battery feedback signal is above the first predetermined threshold, the control circuit stops generating the second control signal, which inactivates the second charging path so that only the first charging path charges the battery; and
   when the battery feedback signal is above a second predetermined threshold which is higher than the first predetermined threshold, the control circuit stops generating the first control signal, which inactivates the first charging path so that none of the first charging path and the second charging path charges the battery.

2. The charger circuit of claim 1, wherein the first charging path and the control circuit are integrated into an integrated circuit, and the second charging path is outside the integrated circuit.

3. The charger circuit of claim 1, further comprising a temperature detection circuit coupled to the control circuit, the temperature detection circuit generating an over temperature detection signal as an input to the control circuit when an environment temperature detected by the temperature detection circuit is over a predetermined temperature threshold, wherein the control circuit determines whether or not to generate the first control signal and the second control signal according to the over temperature detection signal.

* * * * *